United States Patent [19]

Suzuki

[11] Patent Number: 4,998,601
[45] Date of Patent: Mar. 12, 1991

[54] METHOD OF AND APPARATUS FOR CONTROLLED OPERATION OF AN ELEVATOR SYSTEM AT THE OCCURRENCE OF AN EARTHQUAKE

[75] Inventor: Shigehiko Suzuki, Inazawa, Japan

[73] Assignee: Mitsubishi Denki Kabushiki Kaisha, Japan

[21] Appl. No.: 365,526

[22] Filed: Jun. 13, 1989

[30] Foreign Application Priority Data

Jul. 8, 1988 [JP] Japan .................................. 63-170385

[51] Int. Cl.⁵ .............................................. B66B 13/24
[52] U.S. Cl. .................................................... 187/107
[58] Field of Search ........................ 187/107; 364/421; 367/115

[56] References Cited

U.S. PATENT DOCUMENTS

| | | | |
|---|---|---|---|
| 3,792,759 | 2/1974 | Kirsch | 187/107 |
| 4,056,169 | 11/1977 | Showalter | 187/107 |
| 4,069,898 | 1/1978 | Tosato et al | 187/107 |
| 4,653,611 | 3/1987 | Ohta et al. | 187/107 |
| 4,690,251 | 9/1987 | Onoda et al. | 187/107 |
| 4,809,817 | 3/1989 | Kawai | 187/107 |

FOREIGN PATENT DOCUMENTS 60-77081  5/1985  Japan .

Primary Examiner—A. D. Pellinen
Assistant Examiner—W. E. Duncanson, Jr.
Attorney, Agent, or Firm—Leydig, Voit & Mayer

[57] ABSTRACT

A method of and apparatus for controlling operation of an elevator at the occurrence of an earthquake. Estimated seismic intensity data is collected from a plurality of sources at different locations within a geographic region and transferred to an administration section; the geographic region is divided into zones of different seismic intensity based upon the transferred data; seismic intensity at the location of the elevator is assumed upon the occurrence of an earthquake on the basis of location of the elevator in the zones; whether the operation of the elevator is to be permitted is judged according to the assumed seismic intensity; and a trial run is commanded upon a judgement that operation is permitted, whereupon normal elevator operation is restored when the absence of any abnormality has been acknowledged upon travel during the trial run.

13 Claims, 11 Drawing Sheets

FLOW OF CONT OPR AT EARTHQK (COMN ELEV)

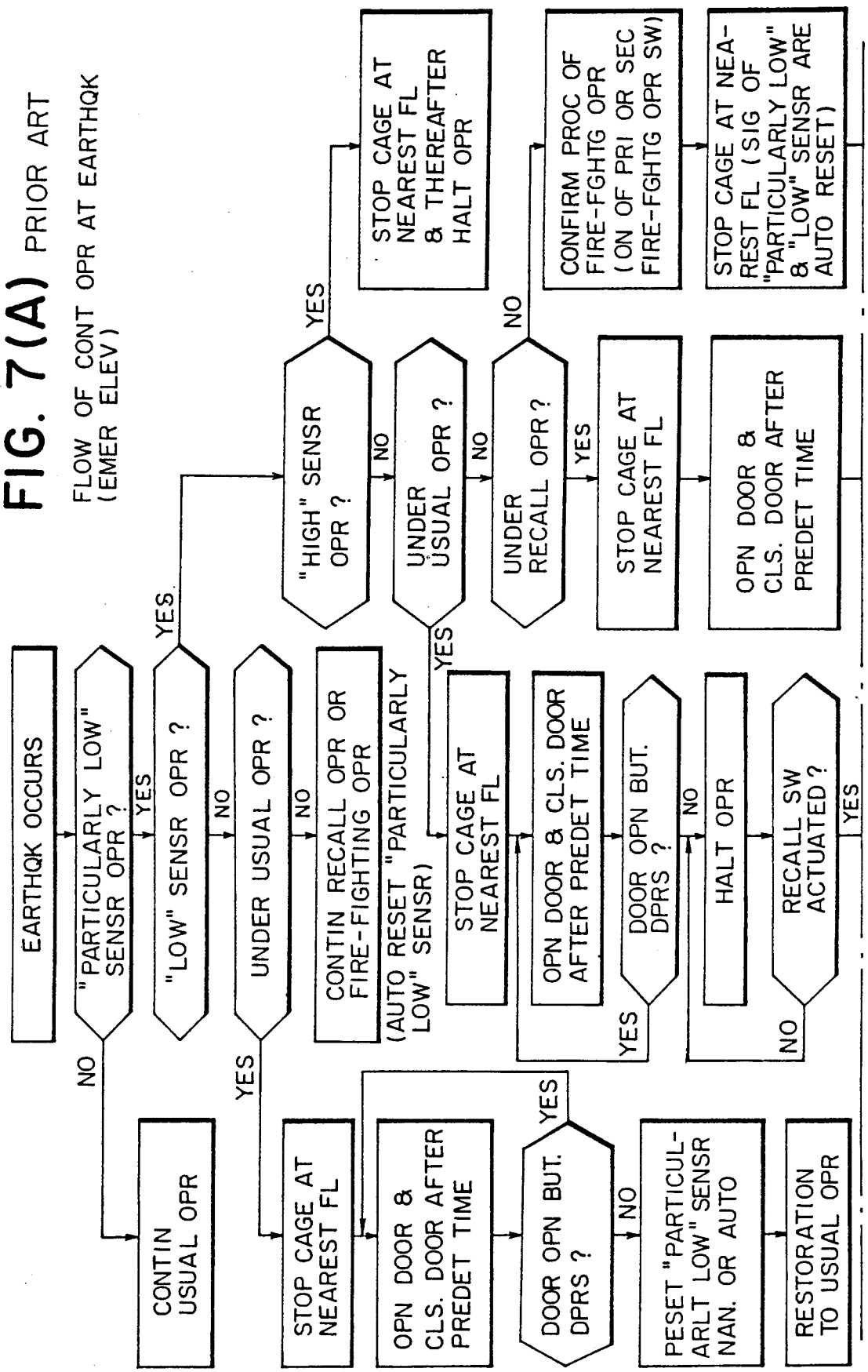

FIG. 8
PRIOR ART

| HGT OF BLDG | PARTICULARLY LOW SET VAL (GAL) | LOW SET VAL (GAL) | HIGH SET VAL (GAL) |
|---|---|---|---|
| UP TO 60m | 80 OR SENSING P-WAVE | 120 | 150 |
| OVER 60m, UP TO 120m | 30, 40, 60, SENSING P-WAVE etc | 60, 80 OR 100 | 100, 120 OR 150 |
| OVER 120m | 25, 30, SENSING P-WAVE etc | 40, 60 OR 80 | 80, 100 OR 120 |

METHOD OF AND APPARATUS FOR CONTROLLED OPERATION OF AN ELEVATOR SYSTEM AT THE OCCURRENCE OF AN EARTHQUAKE

BACKGROUND OF THE INVENTION

This invention relates to a method of and apparatus for controlling the operation of an elevator system at the occurrence of an earthquake, in which the seismic intensity of the earthquake is presumed.

A method of and apparatus for the controlled operation of an elevator at the occurrence of an earthquake are stated in, for example, the Building Standards Act of Japan and the Enforcement Ordinance of the Act, "Interpretation of Technical Standards of Elevators', Appendix: Guide to Earthquake-proof Designs and Executions of Elevators (pp. 255–260). This example of the prior art is illustrated in FIGS. 6(A) and 6(B) by the flow of the controlled operation of a common elevator at the occurrence of an earthquake, and in FIGS. 7(A) and 7(B) by the flow of the controlled operation of an emergency elevator at the occurrence of an earthquake.

Regarding the common elevator, two sorts of seismic sensors which are respectively set to a "particularly low" set value of, for example, 30 gals and a "low" set value of, for example, 60 gals or a seismic sensor which is adapted to be set in two stages are/is disposed in a place near the elevator, such as a machinery room. The set values (in gals) are changed depending upon the heights of the buildings, and some set values are old. For such reasons, various items of data are used. By way of example, the elevator is operated in controlled fashion according to any set value indicated in FIG. 8, namely, according to a situation in which the seismic sensor is operated at the corresponding set value.

Referring to FIGS. 6(A) and 6(B), in a case where only the seismic sensor having the particularly low set value is operated, and thereafter, the seismic sensor having the low set value is not operated, the operation of a traveling cage is once stopped at the nearest floor, and the operation of the elevator is reset to the usual operation thereof after a predetermined period of time. If the seismic sensor having the low set value is operated simultaneously or successively, the cage is stopped at the nearest floor, and the door thereof is opened to safely allow the passengers to exit, whereupon the operation of the elevator is ceased. In this case, the elevator needs to be reset to the usual operation after it has been inspected by the technical expert thereof.

However, in case of the common elevator which has an express zone, as noted down in FIGS. 6(A) and 6(B), a three-stage setting system is adopted, and a "high" set value such as 100 gals is further provided beforehand. In order to prevent the operation of the sensor of the low set value from stopping the cage within the express zone and leaving the passengers confined in the cage, the cage is once stopped, and thereafter, it is caused to arrive at the nearest floor at low speed upon acknowledging the normality of a safety circuit, as long as the seismic sensor of the high set value is not operating. Thus, the operation of the elevator is ceased as in the foregoing.

On the other hand, the emergency elevator is furnished with seismic sensors which have the three-stage set values of "particularly low', "low" and "high" seismic intensity values, as noted down in FIGS. 7(A) and 7(B). When only the seismic sensor having the particularly low set value is operated, operations similar to those in FIG. 6 proceed. However, in a case where a situation, such as the operation of the seismic sensor having the low set value, further arose, a specified controlled operation to be described below is carried out in order to quickly restore the elevator operation.

Even in case of the operation of the sensor of the low set value, unless the sensor of the high set value is operated, it is permitted to make a trial run at low speed, make a fire-fighting run and restore the elevator to the usual operation, after the elevator operation is once ceased.

Meanwhile, an elevator system is sometimes equipped with a derailment detector capable of detecting the situation that a counterweight for a cage came off a rail at the occurrence of an earthquake. In this case, the derailment detector is used conjointly with the seismic sensors, and whichever operates, the operation of the elevator is ceased as indicated in a flow chart of FIG. 9.

The prior-art method of the controlled operation of the elevator at the occurrence of an earthquake is performed according to the flow as stated above. Therefore, the ceases of the operations of the elevators are required in case of the occurrence of a very intense earthquake at which the seismic sensor of the high set value operates. However, in case of the occurrence of a somewhat great earthquake at which the sensor of the low set value operates, the emergency elevator and the common elevator are controlled in different ways. That is, regarding the emergency elevator, even at the operation of the seismic sensor of the low set value, unless the sensor of the high set value is operated, the restoration to the usual operation is permitted on an occasion where the absence of any problem on safety has been determined by making a trial run at low speed. In contrast, regarding the common elevator, when the sensor of the low set value is operated, the elevator is stopped, and it cannot be reset to the usual operation unless it is inspected by a technical expert.

Thus, in the case of the operations of the seismic sensors of the low set values, numerous elevators cease to operate in a considerably extensive region, and they cannot be restored unless a large number of technicians are mobilized for a very long time in order to inspect them one by one. Moreover, each seismic sensor is set with an allowance for a higher degree of safety in consideration of human lives, etc. Therefore, even when the sensor of the low set value is operated, actually the situation in which the devices of the elevator are damaged arises very infrequently. In most of the elevators, the technical experts' inspections result in vain services in which the seismic sensors are merely reset without making any special repairs, etc., whereupon the elevators are restored to the usual operations.

In this manner, the urgent services concentrate in a section which administrates the elevators. Accordingly, there has been the problem that the elevators being highly public cease for long periods of time expended on the restoration services. Summary of the Invention:

This invention has been made in order to solve the problem mentioned above, and has for its object to provide a method of and an apparatus for the controlled operation of an elevator system at the occurrence of an earthquake, in which the propriety of the operation of the ceased elevator system can be determined quickly after the occurrence of the earthquake.

With the method of and apparatus for the controlled operation of an elevator system at the occurrence of an earthquake according to this invention, the seismic intensity data of a specified elevator system is obtained in order to estimate a seismic intensity at the occurrence of the earthquake, and the seismic intensity in the elevator system within a predetermined region is presumed on the basis of the obtained data.

Further, the propriety of the restoration of the operation of the elevator system is determined according to the presumption.

Still further, a trial run is commanded upon a judgment based on the presumed seismic intensity, and the elevator operation is restored when the absence of any abnormality has been confirmed through the travel of the trial run.

BRIEF DESCRIPTION OF THE DRAWINGS

FIGS. 6(A), 6(B), 7(A), and 7(B) are flow charts showing the control steps of a prior-art example;

FIG. 8 is a table showing the set values of seismic sensors in the prior art.

DESCRIPTION OF THE PREFERRED EMBODIMENTS

Now, embodiments of this invention will be described with reference to the drawings.

Figure 1:
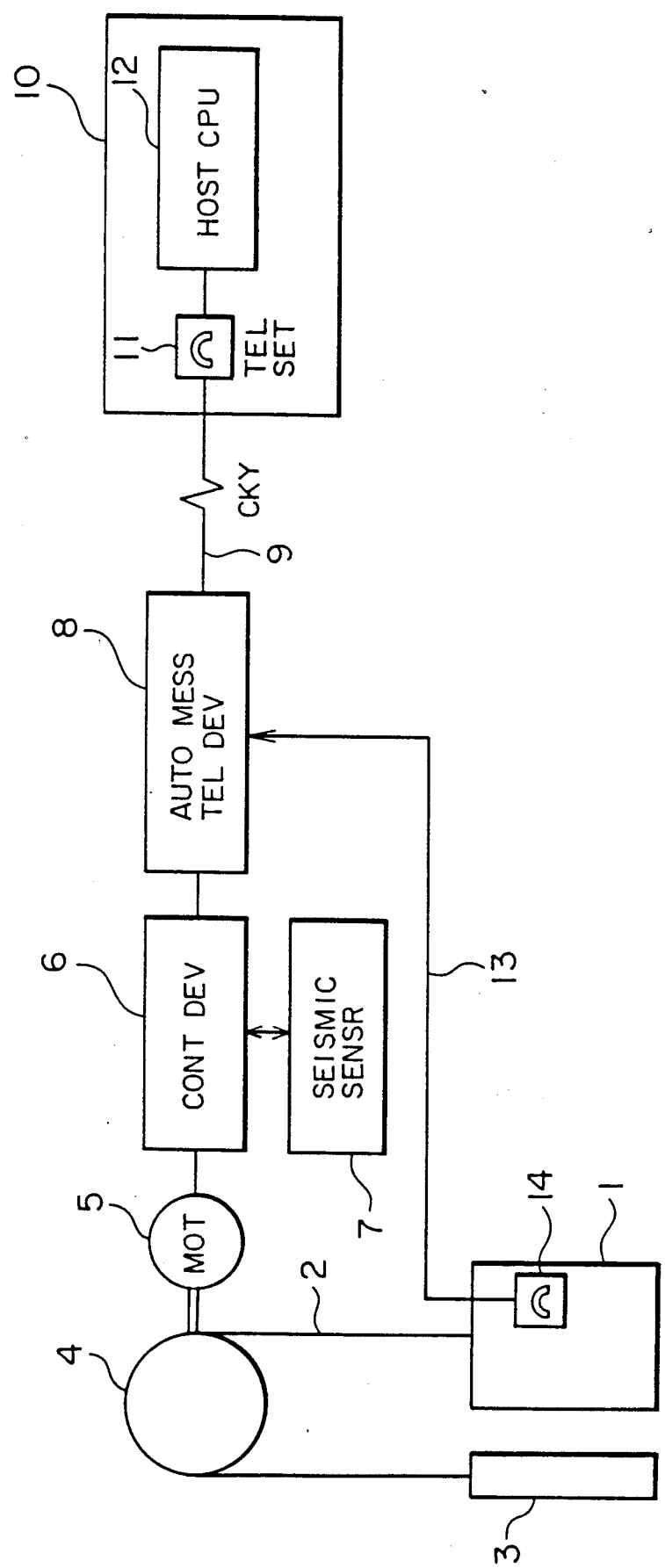
FIG. 1 is a setup diagram of an elevator operating apparatus which is an embodiment of this invention.

FIG. 1 is a setup diagram of an embodiment of this invention. Numeral 1 designates the cage of an elevator system, which is suspended from a sheave 4 along with a counterweight 3 in wellknown bucket fashion by a rope 2. Numeral 6 indicates an elevator control device, which drives and controls a driving motor 5 so as to cause the cage 1 to ascend and descend.

Shown at numeral 7 is a seismic sensor, the set values of which are set in the two stages of a particularly low intensity and a low intensity. When the seismic sensor 7 operates, the control device 6 performs the controlled operation in accordance with "Guide to Earthquake-proof Designs and Executions of Elevators', namely, the flow chart shown in FIGS. 6(A) and 6(B). Also, it gives a command to an automatic message telephone device 8 so as to automatically dial the telephone set 11 of an elevator administration section 10 and to notify this section of the operation of the seismic sensor 7 through a telephone circuit 9. The telephone set 11 is also connected to a host computer 12 which is installed in the elevator administration section 10. The host computer 12 receives digital signals (various items of data) sent from the control device 6, and displays them on a CRT display for a monitoring staff member. Simultaneously, the automatic message telephone device 8 permits the conversation between a cage passenger and the elevator administration section 10 by means of a telephone set 14 installed in the cage 1 and connected to the telephone device 8 through a telephone circuit 13.

The administration section 10 is connected with the message devices 8 of a large number of elevator systems through the circuits, whereby data items are transferred therebetween. The signals of derailment detectors are also transferred to the host computer 12 of the administration section 10 through the elevator control devices 6 as well as the message devices 8.

The host computer 12 comprises an input unit for receiving signals, an output unit for delivering commands etc., and a processing unit and a storage unit for performing calculations and making judgements in accordance with predetermined programs. Further, it comprises input/output interfaces such as a keyboard and the CRT display in order that the monitoring staff member may be able to take necessary steps and make decisions.

Figure 2:
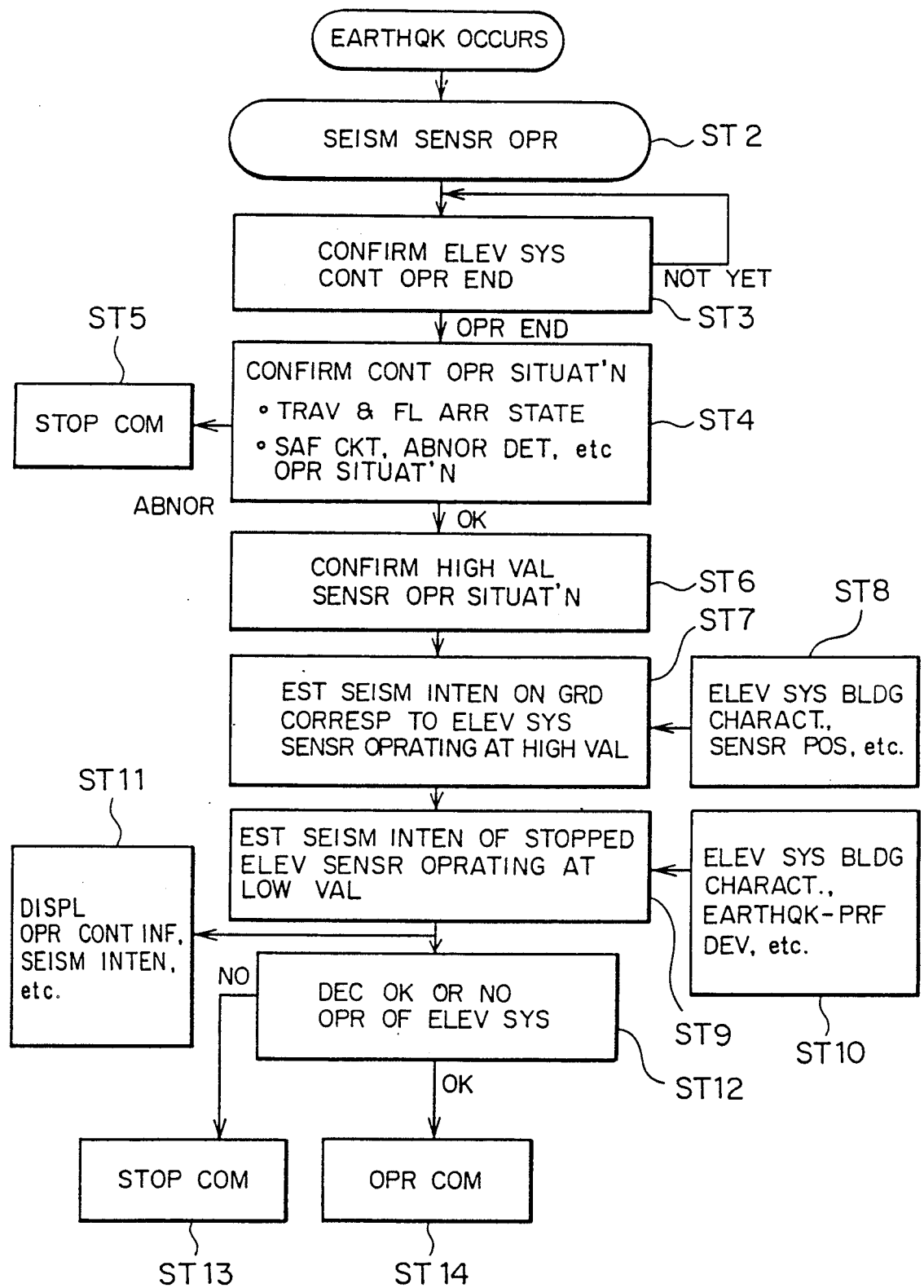
FIG. 2 thru 4 are flow charts showing the control steps of this invention.

Next, the operation of the apparatus in FIG. 1 at the occurrence of an earthquake will be described with reference to FIG. 2.

When an earthquake occurs (ST1), the seismic sensor 7 disposed near the cage 1 operates (ST2). Each of the elevator systems installed within a predetermined region is subjected to the controlled operation according to the instructions of the individual control device 6 in conformity with the flow chart of FIGS. 6(A) and 6(B) or FIGS. 7(A) anD 7(B) and the end of the controlled operation is confirmed (ST3).

Figure 6A:
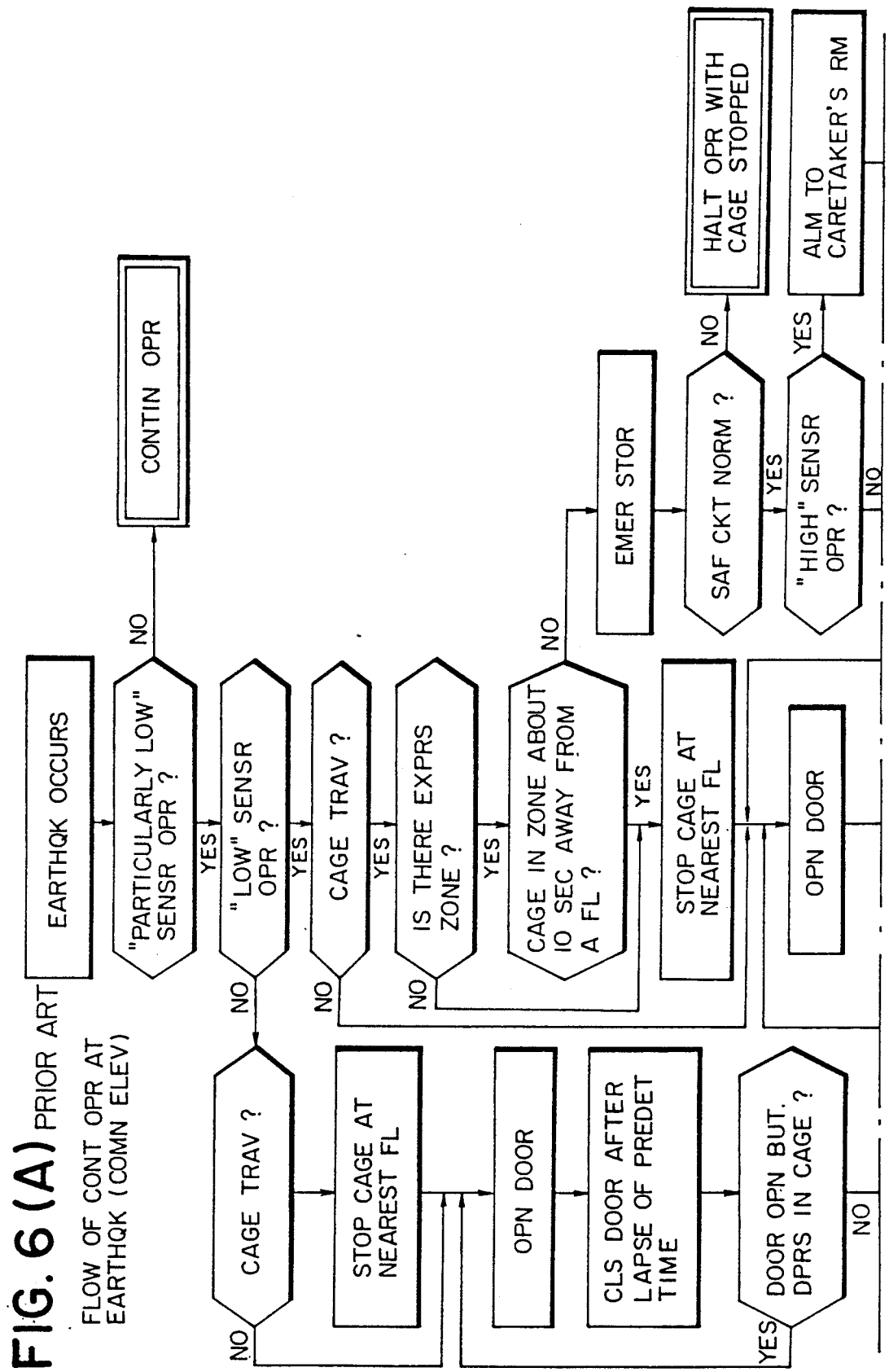
Figure 6B:
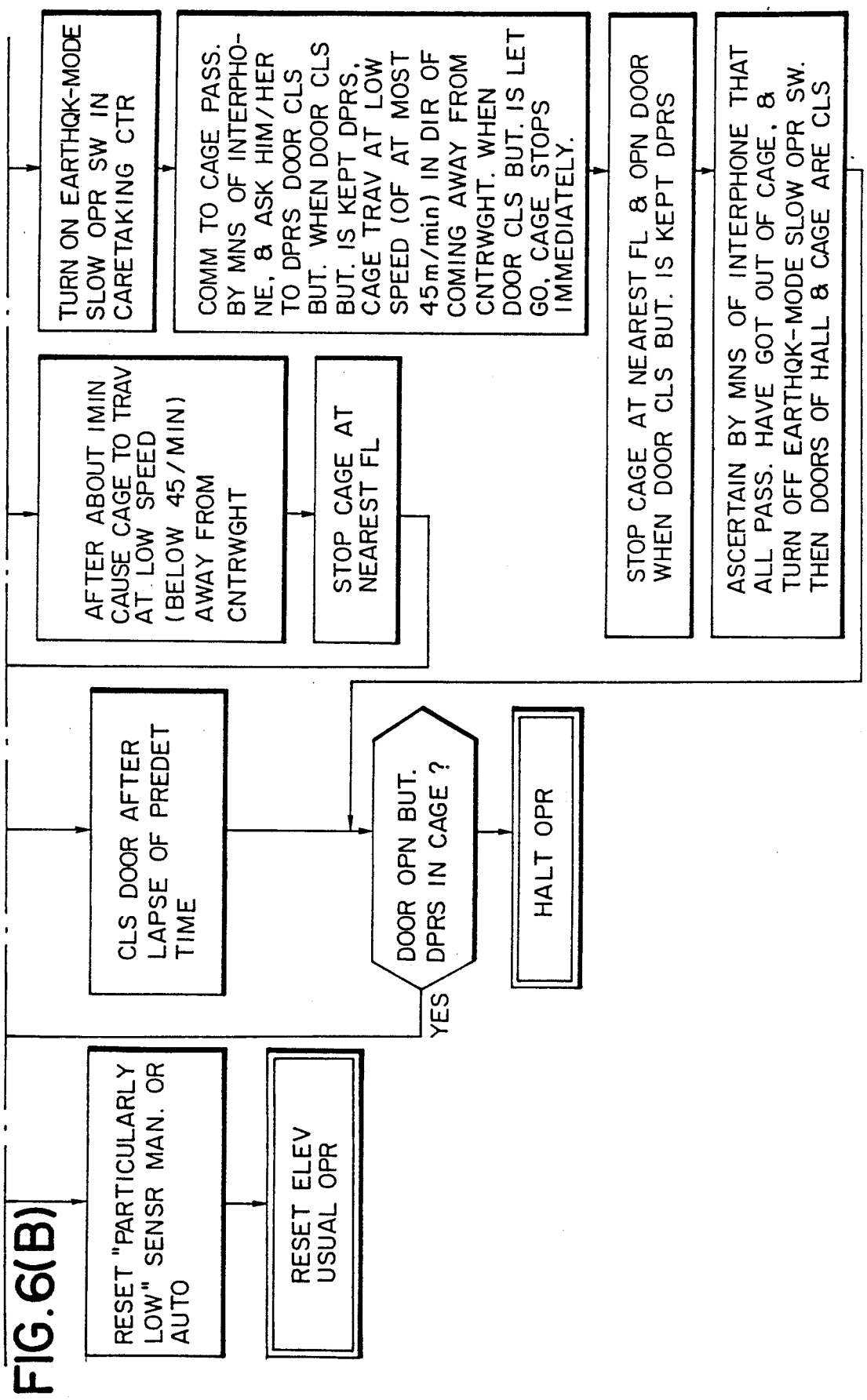
Figure 7B:
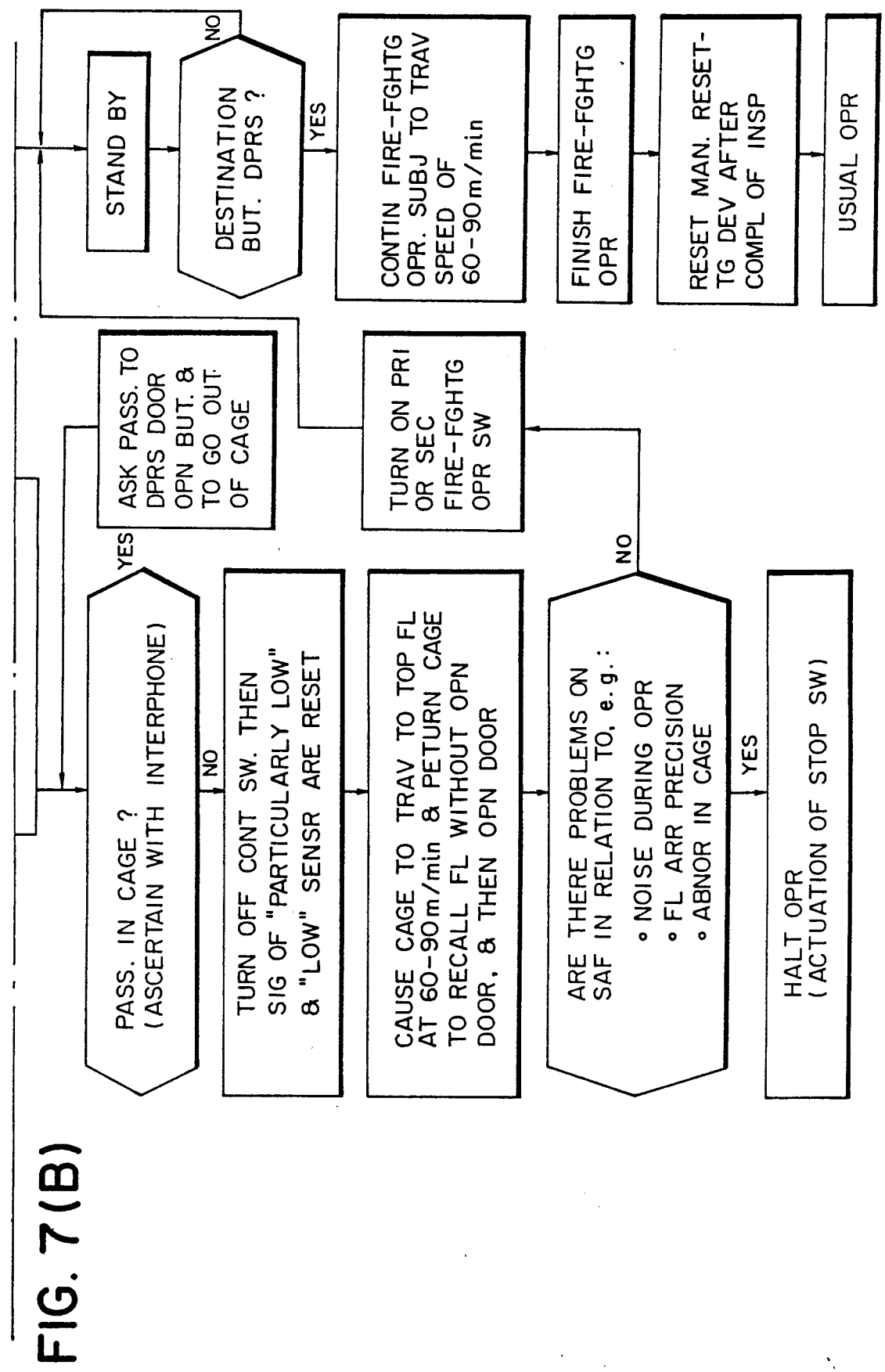
Figure 9:
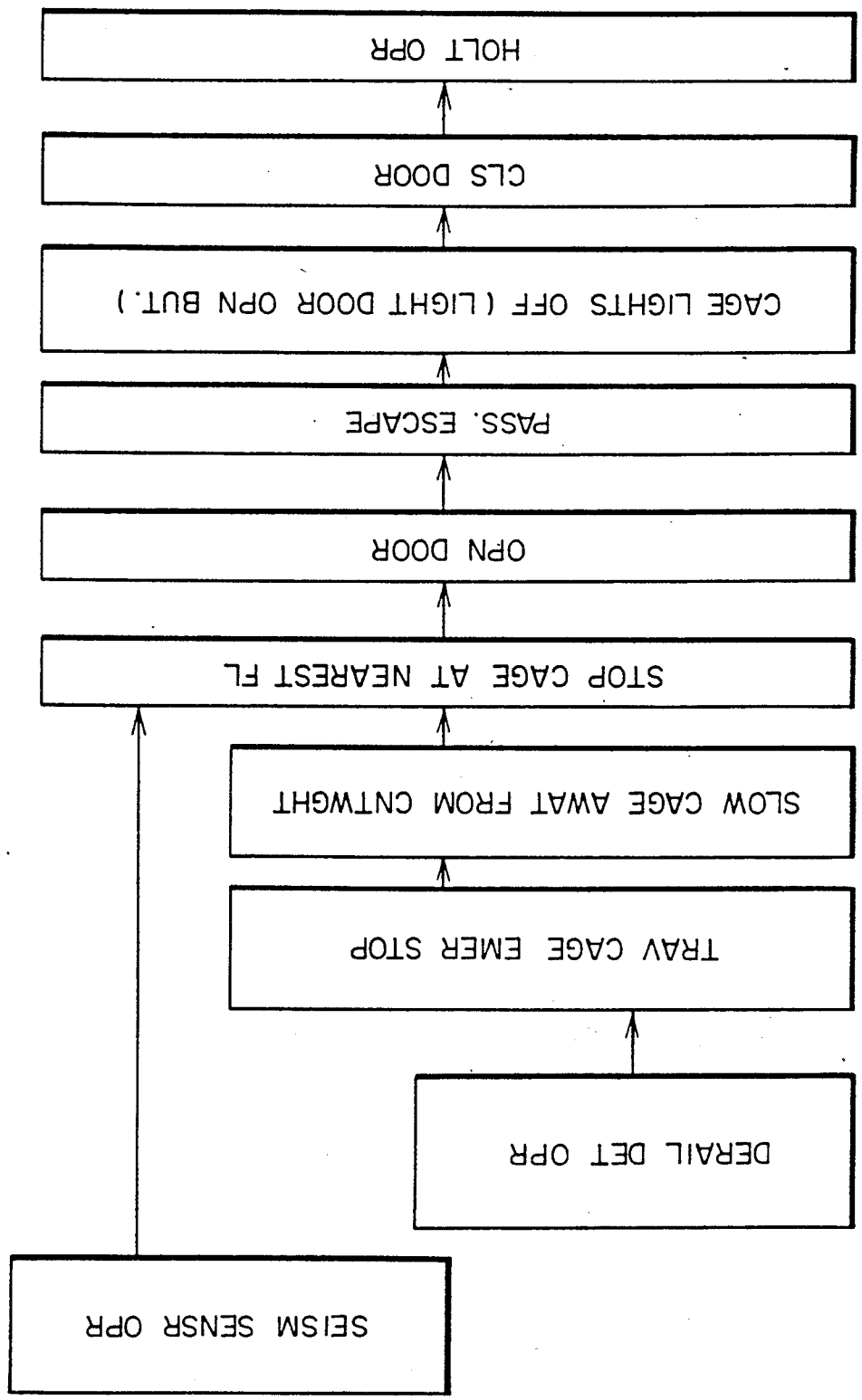
FIG. 9 is a flow chart showing the operation of a derailment detector in the prior art.

By way of example, when only the "particularly low" sensor of the seismic sensor 7 operated, the control device 6 operates in conformity with the flow of FIGS. 6(A) and 6(B) to stop the cage 1 at the nearest floor if it is traveling, to open the door of the cage 1, and to automatically reset the "particularly low" sensor and restore the usual operation of the elevator after the lapse of a predetermined time. On this occasion, the control device 6 automatically notifies the elevator administration section 10 of the operation of only the "particularly low" sensor and the restoration to the usual operation through the medium of the automatic message telephone device 8. In the administration section 10, the message is acknowledged and is set as reference data for the next maintenance job of the elevator system. If the elevator is not restored to the usual operation in spite of the operation of only the "particularly low" sensor, the usual operation can also be restored in such a way that a reset signal for the "particularly low" sensor is sent from the administration section 10 through the telephone circuit 9 automatically or by the monitoring staff member.

The transfer of such signals is effected between the message device 8 and the telephone set 11 through the circuit 9 which is data transfer means.

When both the "particularly low" sensor and "low" sensor of the seismic sensor 7 operate, the control device 6 operates in conformity with the flow chart of FIGS. 6(A) and (B), to stop the cage 1 at the nearest floor if the cage is traveling, and to cease the elevator operation after opening the door. Also, the control device 6 sends the automatic message device 8 a signal indicating that both the "particularly low" and "low" sensors of the seismic sensor 7 operated and a signal indicating that the elevator operation is under cessation after the controlled operation. The automatic message device 8 sends the message to the telephone set 11 of the elevator administration section 10 through automatic dialing. The computer 12 having received the message confirms the situation of the controlled operation including the operating situations of other detectors (ST4), and stores it.

At this time, if there is any elevator system whose operation is restored in spite of the operation of an abnormality detector such as the derailment detector or the presence of an abnormality in the safety circuit, a cease command can be issued (ST5). As the result of the above operations, the operating situations are transmitted from the large number of elevator systems to-be-administered within the predetermined region and are collected in the storage unit of the computer 12.

Subsequently, from among the collected information items, specified estimation data, for example, the operating situation of a seismic sensor which is adapted to be set in the three stages of particularly low, low and high seismic intensity values and which is disposed in a specified elevator system is selected, and it is confirmed (ST6). As the operating situations of the sensor set in the three stages, there are a case where the sensor operated up to the high set value and a case where it is operated up to the low set value without operating up to the high set value. By way of example, even when the sensor did not operate at the high set value in a certain building, the earthquake might have had a seismic intensity requiring the cessation of an elevator operation when viewed from another building nearby. One of the causes therefor is the different set values of the seismic sensor 7. Moreover, the heights of the building may be different, and each of the sensors can be disposed in a machinery room at the top of an elevator shaft or at the intermediate floor of the building. Further, the behaviors of the buildings such as rigidities may be different. In consideration of these factors, the operating situations of the elevator systems having the three-stage setting sensors within the predetermined region need to be rearranged and reestimated in terms of the seismic intensities. Therefore, the set value of the seismic sensor of each elevator system is multiplied by a conversion coefficient etc. in which the aforementioned conditions of the specified elevator are taken into account, and the product is used as the seismic intensity on the ground corresponding to the elevator system (ST7 and ST8).

In order to judge the restorations of the operations of the elevator systems within the predetermined region, the seismic intensities may be classified into two stages, one permitting the operation and the other ceasing the operation, or into two three stages with an intermediate intensity for a trial run added. The seismic intensity evaluated from the specified elevator as stated above can be used for a method which subdivides the predetermined region on the basis of the seismic intensity for the propriety of the elevator operation.

By way of example, points at which the seismic intensities of the ground corresponding to the specified elevators permit elevator operations are connected by a line, and the elevator systems within the limits of the line, which ceased to operate once after the occurrence of the earthquake, as to which the seismic intensities can be presumed to permit the operations even when the behaviors of the buildings, etc., of the elevator systems are considered, and which are free from any problem on earthquake-proof countermeasures, can be judged as being permitted to operate (ST9 and ST10).

The results can be displayed in the administration section 10 (ST11) or subjected to automatic decisions (ST12), and a cease command (ST13) and an operation command (ST14) can be issued to the individual elevator systems through the data transfer means 9.

Figure 3:
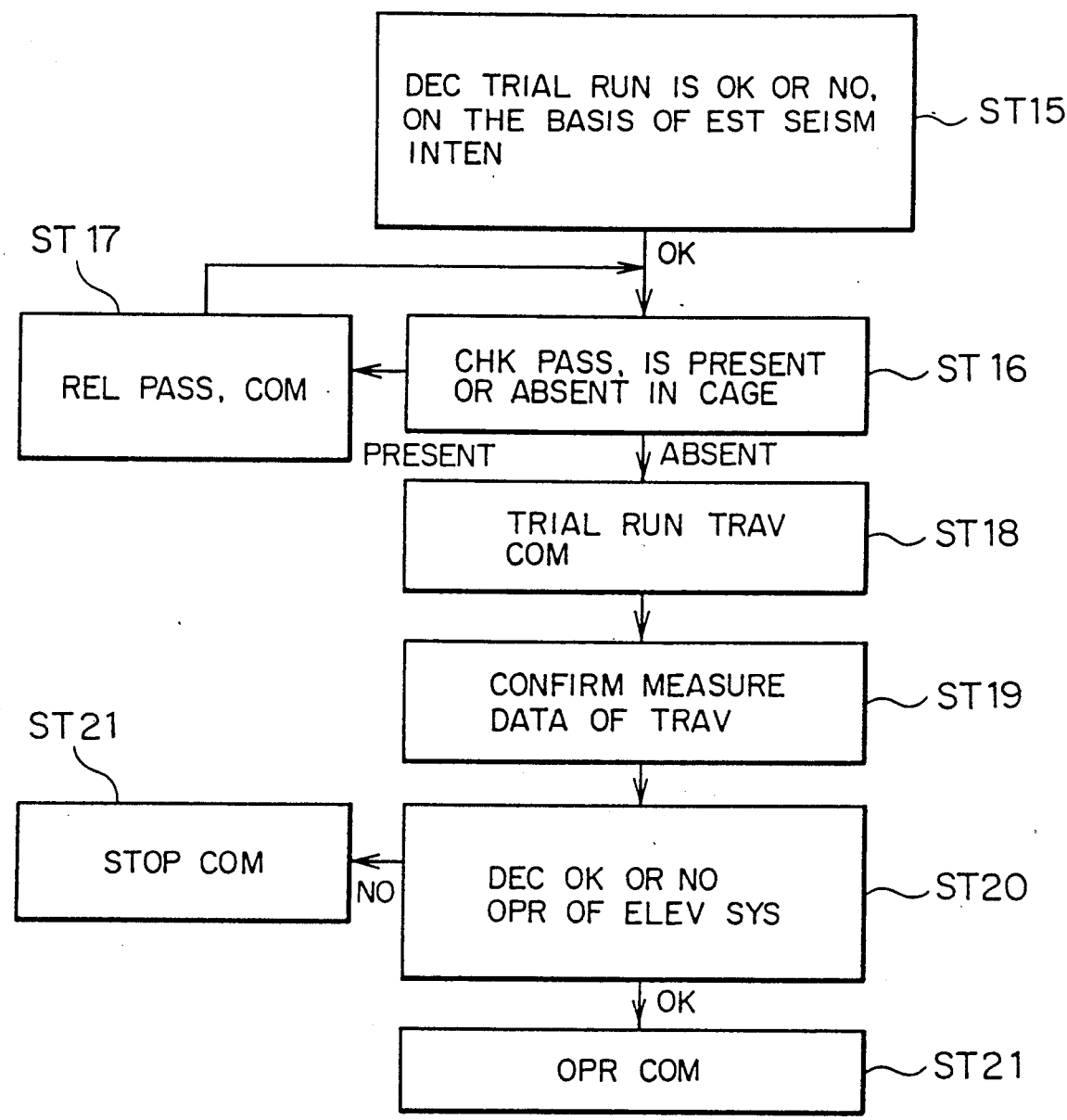

FIG. 3 shows a flow chart which commands the trial run after the elevator operation has been decided as being permitted at the step ST12.

First, the elevator system which is once ceased by the controlled operation is studied as to the propriety of the operation (ST15). In a case where the operation is proper, the computer 12 functions to check whether any passengers are present or absent in a cage, through the circuit 9, message device 8 and control device 6 (ST16). If there is a passenger present, the computer 12 functions to take a measure to release the passenger (ST17) (i.e. allow the passenger to exit the elevator car). An example of a practicable method therefor is such that the cage 1 is furnished with a sensor which decides the presence or absence of any passenger (for example, a load detector) and whose output signal is sent to the administration section 10 through the control device 6, and that when the passenger is present in the cage 1, an automatic announcement device disposed in the cage 1 announces the content of "Please depress the door opening button and get out of the cage." in accordance with a command from the administration section 10.

After the absence of a passenger has been confirmed, the next step (ST18) issues a trial run travel command, according to which the cage 1 of the elevator system travels slowly from the top floor to the bottom floor within the shaft thereof. On this occasion, a fixed traveling speed is desirable, and the door of the cage is kept closed at all times including the times of the stops of the cage at the top floor etc.

Predetermined measurements to be described below are made in the traveling mode (ST19), and the presence or absence of any abnormality is checked (ST20). Depending upon the checked result, a command of ceasing the elevator operation (ST21) or a command of restoring the usual operation (ST22) is issued.

As the measurement data items in the case where the cage 1 of the elevator system is caused to ascend and descend in accordance with the trial run command, there are the speed of the cage, a floor arrival state including a cage position at the stop, the vibrations of the cage, an operating situation concerning if the detection of a position is normal, the situation of transfer of signals between the cage and the control device, noise during the travel of the cage, and so on. Any of these data items has its normality or abnormality determined, depending upon whether or not a difference greater than an allowable value is exhibited with respect to a designated numerical value or a numerical value during the normal travel of the cage. If an abnormality is found, the operation cessation command is issued, and the nature of the abnormality is displayed.

Further, the elevator system may well be equipped with the derailment detector and other various sensors such as a sensor for sensing the movement or fall of any machine in the machinery room, a sensor for sensing the dislocation of the rope from the sheave of a hoist, and a sensor for sensing the entanglement of the rope or a cable with any device disposed inside the shaft, whereby various items of data are collected with the sensors during the trial run travel so as to judge the propriety of the elevator operation.

As regards a method of checking the abnormality, in the case of deciding the propriety of the restoration to the usual operation by way of example, a sensor for abnormal noise is provided in the cage 1 or above or below the cage 1, and the output signal thereof is sent to the administration section 10 through the control device 6 together with other signals, such as the signal of a floor arrival precision, while a program which decides the propriety of the restoration to the usual operation on the basis of the various signals is loaded in the host computer 12 installed in the administration section 10. Thus, the propriety of the restoration to the usual operation can be automatically deduced.

The adoption of these methods eliminates also the problem that inspected results are dispersed because the different technicians inspect the individual elevator systems as in the prior art.

Although, in the above embodiment, the seismic sensor installed at present has been referred to as the means for sensing the estimation data, naturally a special seismograph may well be utilized or installed.

Figure 4:
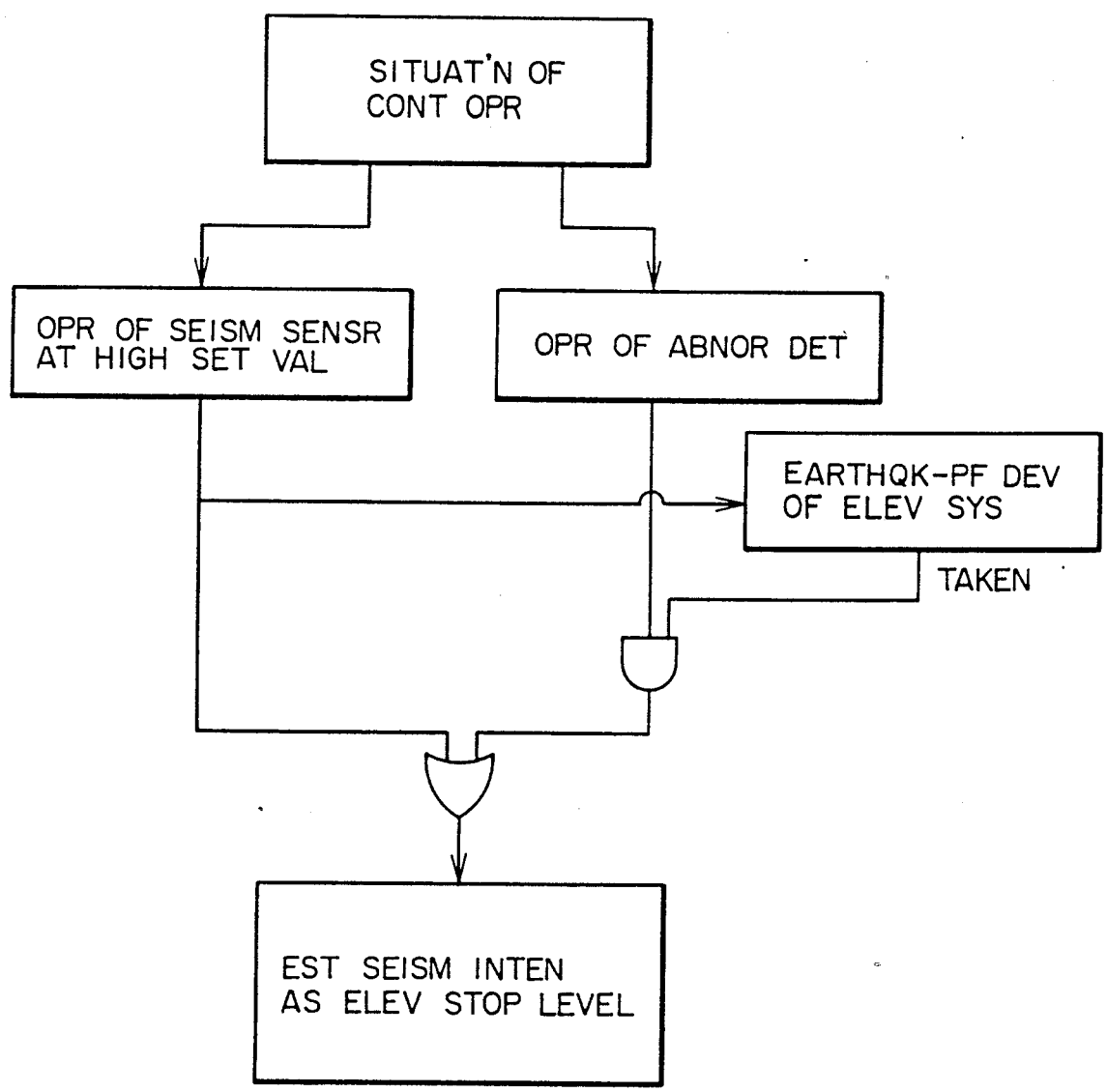

In addition, although the seismic intensity has been presumed in terms of the gal level, it may well be judged by utilizing the operation situation of an abnormality detector. Such an example is shown in a flow chart of FIG. 4. In a case where the detecting operation of the abnormality detector such as a derailment detector arose and where satisfactory earthquake-proof countermeasures are already taken for the elevator system concerned, the seismic intensity is estimated to be an elevator ceasing level, irrespective of whether or not the seismic sensor operated at its high set value. Thus, even a phenomenon which cannot be grasped with only the seismic intensity can be coped with.

Moreover, although the telephone circuit has been used for the transfer of data in the embodiment, a radio system is also possible.

Figure 5A:
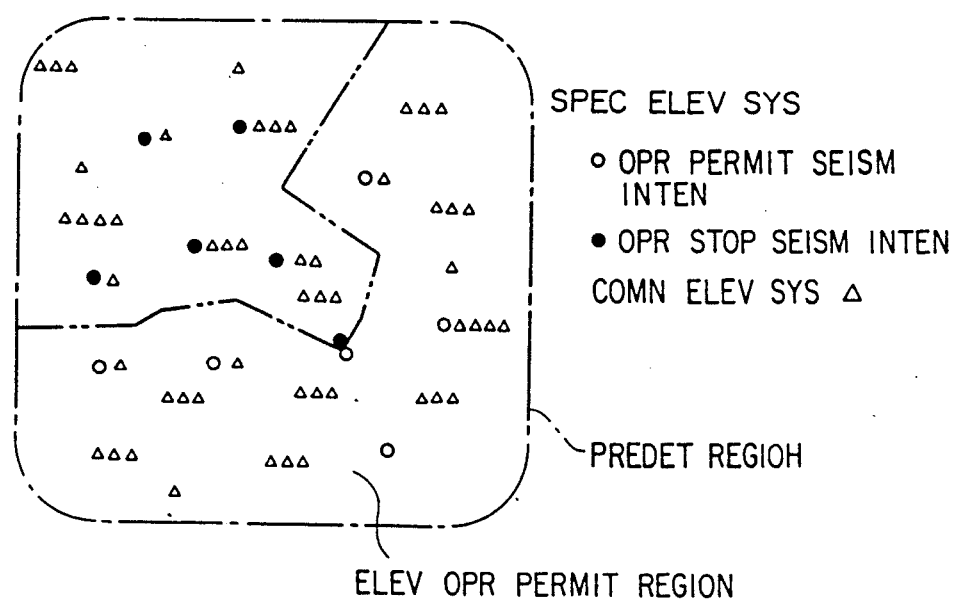
FIGS. 5(a) and 5(b) are diagrams for elucidating the principles of this invention.

Further, the method which divides a predetermined region with the line connecting the specified elevator systems has been mentioned as the method of presuming the distribution of seismic intensities within the predetermined region. However, if the number of estimable points is large, there is also a method in which, as illustrated in FIG. 5(a), the middle points between operation permitting level points and operation ceasing level points are obtained as divisive points.

Figure 5B:
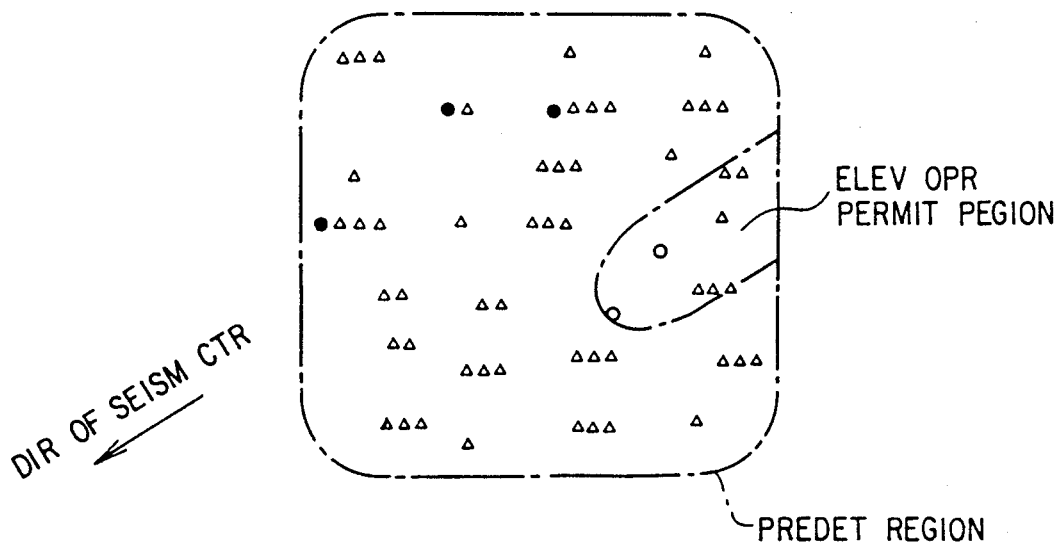

On the other hand, if the number of estimation points is small, external information items, for example, the position of the seismic center and the degree on the seismic scale can also be input to the computer 12 so as to be utilized. FIG. 5(b) shows such an example, in which the distribution of seismic intensities is presume with also the direction of the seismic center taken into account. The presumed distribution of the seismic intensities is displayed on the display device such as a CRT.

Incidentally, although the embodiment has explained the whole construction as to the example of the automatic system based on the computer 12, naturally some parts may well be relied on the judgements and actuations of a monitoring staff member. As a practicable example, the monitoring staff member confirms the operating situation of the seismic sensor 7 and the operating situation of one particular elevator system on the CRT display device of the host computer 12. At this time, the monitoring staff member confirms on the CRT the operating situation of the seismic sensor of another elevator system which is connected with the monitor section 10 by the telephone circuit 9 similarly to the particular elevator system in the same region as that of the particular elevator system, the seismic sensor being a three-stage setting one furnished with a sensor of high set value. Further, he/she grasps a seismic intensity in the place of installation of the particular elevator system on the CRT. Then, he/she judges the propriety of the operation of the elevator system by considering also the behaviors of a building in which the elevator system is installed, the circumstances of the earthquake-proof countermeasures of various equipments, and so forth. When the elevator operation has been judged as being proper, the monitoring staff member tries to talk with a passenger in the cage 1 through the telephone set 14, and subject to a response, he/she asks the passenger to depress a door opening button and to go out of the cage 1. Upon confirming the absence of any passenger in the cage 1 through the telephone set 14, the monitoring staff member sends a trial run command from the input terminal of the host computer 12 to the control device 6 through the telephone circuit 9, and the control device 6 moves the cage 1 from the bottom floor to the top floor at low speed without opening the door. During the trial run, the monitoring staff member checks the presence or absence of abnormal noise through the telephone set 14 and checks the various signals of a traveling speed, a floor arrival precision, etc. sent from the control device 6 through the telephone circuit 9 and displayed on the CRT, thereby determining the presence or absence of any problem on safety and the propriety of the restoration of the elevator operation to the usual operation. When the restoration to the usual operation has been judged proper, the monitoring staff member sends a restoration command from the input terminal of the host computer 12 to the control device 6 through the telephone circuit 9 and resets the "low" sensor of the seismic sensor 7, whereby the elevator system is restored to the usual operation.

By the way, the "particularly low" sensor has been automatically reset after the predetermined time in accordance with the flow of FIGS. 6(A) and 6(B).

As described above, according to this invention, the seismic intensity of an elevator system within a predetermined region is presumed at the occurrence of an earthquake on the basis of seismic intensity data obtained from a specified elevator system within the region. Therefore, the invention has the effect that judgements for restoring elevator operations can be made quickly and reliably after the occurrence of the earthquake, whereby a large number of elevator systems can be promptly restored to normal operation.

What is claimed is:

1. A method of controlling operation of a first elevator at a location within a predetermined geographic region at the occurrence of an earthquake, the geographic region also having a plurality of other elevators at different locations, said method comprising:
   the step of providing estimation data items for estimating seismic intensity from different sources including sensors at a plurality of elevator locations within the predetermined geographic region;
   the step of transferring said estimation data items to an administration section and collecting said estimation data items in the administration section;
   the step of dividing the predetermined geographic region into zones of different seismic intensity on the basis of said estimation data items from the different sources;
   the step of providing an assumed seismic intensity in the vicinity of the first elevator based upon its location within the different zones; and
   the step of controlling the first elevator on the basis of the assumed seismic intensity.

2. A method of controlling operation of an elevator system at the occurrence of an earthquake as defined in claim 1, further comprising, prior to the step of controlling the first elevator, the step of determining whether the assumed seismic intensity falls within a predetermined level, and deciding whether operation of the first elevator is permitted.

3. A method of controlling operation of a first elevator at the occurrence of an earthquake as defined in claim 2, wherein the step of controlling the first elevator comprises:

the step of issuing a trial run command for causing a cage of the first elevator to travel under predetermined operating conditions, after deciding that operation of the first elevator is permitted on the basis of the assumed seismic intensity; and the step of issuing a command for operating the first elevator, after absence of any abnormality has been confirmed on the basis of predetermined measurements made during the travel of the cage during a trial run.

4. A method of controlling operation of a first elevator at the occurrence of an earthquake as defined in claim 3, further comprising:

the step of sensing presence or absence of a passenger in the cage, after deciding that operation of the first elevator is permitted; and the step of commanding an operation of releasing the passenger, when the presence of a passenger has been sensed.

5. A method of a controlled operation of a first elevator at the occurrence of an earthquake as defined in claim 3, wherein abnormal noise in and near the cage is sensed as the measurement during the trial run travel.

6. A method of controlling operation of a first elevator at the occurrence of an earthquake as defined in claim 1, wherein one of the different sources is at a location at which the first elevator is installed.

7. A method of controlling operation of a first elevator at the occurrence of an earthquake as defined in claim 6, wherein the seismic intensity of the first elevator within the predetermined region is assumed in such a way that the assumed seismic intensity at the location at which the first elevator is installed is converted into a seismic intensity acting on said first elevator.

8. A method of controlling operation of a first elevator at the occurrence of an earthquake as defined in claim 1, wherein the step of providing estimation data items from different sources includes providing estimation data items from a source located external from the predetermined geographic area.

9. An apparatus for controlling operation of a first elevator at the occurrence of an earthquake, comprising:

a plurality of estimation data output means for sensing and providing seismic intensity estimation data items from a plurality of different locations associated with a geographic region in which the first elevator is located;

data transfer means for automatically transferring the estimation data items provided by said estimation data output means to an administration section;

seismic intensity assumption means disposed in the administration section for dividing the geographic region into zones of different seismic intensity on the basis of the estimation data items received from said data transfer means and for calculating seismic intensity acting on the first elevator in accordance with the location of the first elevator in the zones; and means for controlling the first elevator on the basis of a calculated seismic intensity.

10. An apparatus for controlling operation of a first elevator at the occurrence of an earthquake as defined in claim 9, further comprising decision means for determining whether calculated seismic intensity falls within a predetermined range, and for deciding whether operation of the first elevator is permitted.

11. An apparatus for controlling operation of a first elevator at the occurrence of an earthquake as defined in claim 10, wherein said means for controlling includes trial run command means for issuing a trial run command which causes a cage of the first elevator to travel under predetermined trail run conditions, after said decision means has decided that the operation of the first elevator is permitted; and operation command means for issuing an operation command which operates the first elevator, after the absence of any abnormality has been confirmed on the basis of predetermined measurements made during the trial run 12. An apparatus for controlling operation of a first elevator at the occurrence of an earthquake as defined in claim 9, wherein each said estimation data output means comprises a seismic sensor having set values which are set in three stages.

13. An apparatus for a controlled operation of a first elevator at the occurrence of an earthquake as defined in claim 9, wherein said estimation data output means comprises an abnormality sensor which senses an abnormality and produces an output for stopping elevator operation.

* * * * *

UNITED STATES PATENT AND TRADEMARK OFFICE
CERTIFICATE OF CORRECTION

PATENT NO. : 4,998,601

DATED : March 12, 1991

INVENTOR(S) : Suzuki

It is certified that error appears in the above-identified patent and that said Letters Patent is hereby corrected as shown below:

Column 10, line 30, change "trail" to --trial--;

line 37, after "run" insert --travel.--.

Signed and Sealed this

Twenty-second Day of September, 1992

Attest:

DOUGLAS B. COMER

*Attesting Officer*    *Acting Commissioner of Patents and Trademarks*